C. E. CLARK.
VARIABLE SPEED TRANSMISSION DEVICE.
APPLICATION FILED FEB. 18, 1913.
1,083,348.
Patented Jan. 6, 1914.
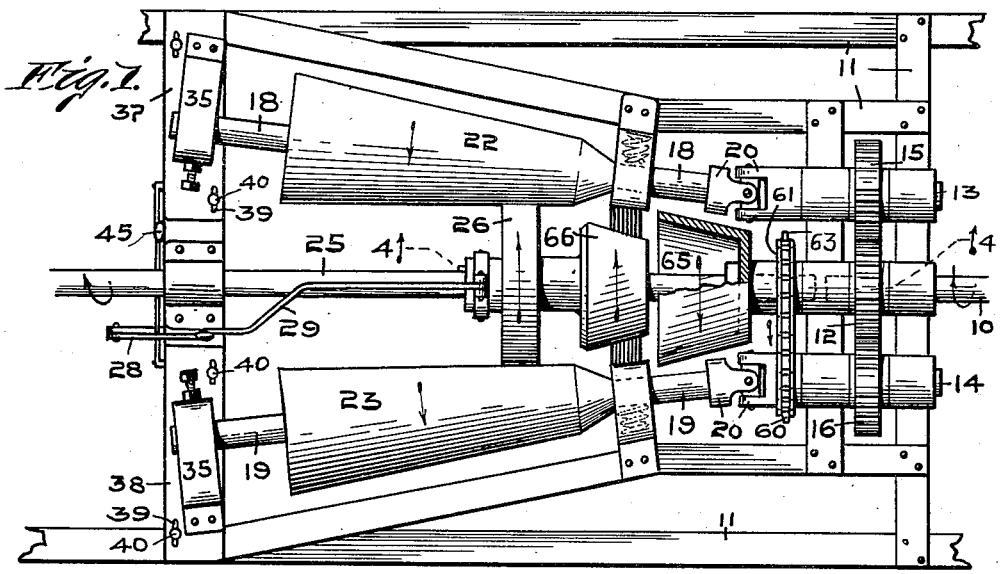
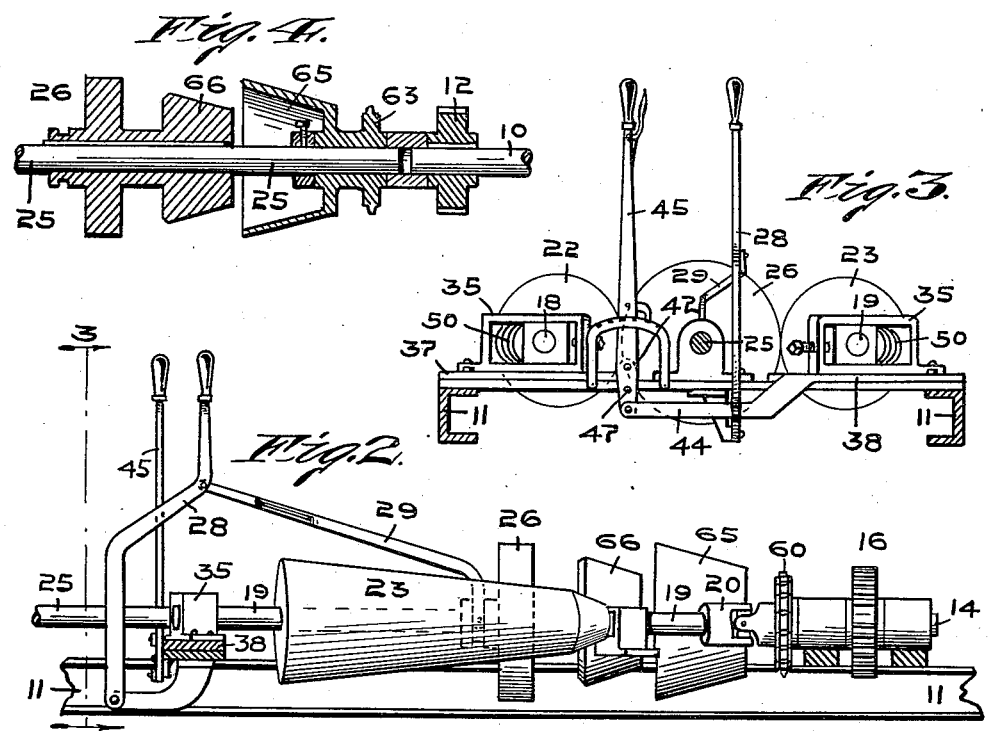
WITNESSES:
L. B. Woerner,
J. L. Larson,
INVENTOR,
Charles E. Clark,
By Minturn & Woerner
ATTORNEYS.

UNITED STATES PATENT OFFICE.

CHARLES E. CLARK, OF BIG SPRINGS, INDIANA, ASSIGNOR OF FORTY ONE-HUNDREDTHS TO WILLIAM R. MOSS, OF SHERIDAN, INDIANA.

VARIABLE-SPEED-TRANSMISSION DEVICE.

1,083,348.      Specification of Letters Patent.      Patented Jan. 6, 1914.

Application filed February 18, 1913. Serial No. 749,100.

*To all whom it may concern:*

Be it known that I, CHARLES E. CLARK, a citizen of the United States, residing at Big Springs, in the county of Boone and State of Indiana, have invented certain new and useful Improvements in Variable-Speed-Transmission Devices, of which the following is a specification.

This invention relates to a variable speed transmission device; and the object of the invention is to provide means whereby the direction of movement of rotation may be changed between the points of production and of application, and also in the provision of means by which an increase or decrease in the travel of said movement of rotation can be effected.

A further object of the invention is to provide means whereby the speed of the driven parts may be gradually increased or decreased, thereby eliminating the sudden jars occurring in devices of the sliding gear type.

I accomplish the above objects of the invention by means of the transmission device illustrated in the accompanying drawings, forming a part hereof, in which—

Figure 1 is a top or plan view of the construction embodying my invention. Fig. 2 is a side elevation of the construction shown in Fig. 1, in which a part of the framework is omitted. Fig. 3 is an end view of the construction on the dotted line 3—3 in Fig. 2. Fig. 4 is a central vertical sectional view on the dotted line 4—4 in Fig. 1.

Referring to the drawings, the speed transmission device comprises a main power-shaft 10 to which the power is initially applied from any suitable power generating device (not shown). The shaft 10 is supported in suitable bearings on its frame 11. The power shaft 10 is provided with a pinion 12 which is keyed thereon and rotates therewith. Mounted parallel with the shaft 10 are the secondary shafts 13 and 14, each of which carries a pinion 15 and 16. These pinions are keyed fast to their respective shafts so as to rotate therewith, and both engage or mesh with the pinion 12 mounted on the main shaft 10 and through which means the two shafts 13 and 14 are rotated in the same direction. The shafts 13 and 14 engage and impart movement of rotation to the shafts 18 and 19 through universal joints 20, 20, and each of the shafts 18 and 19 has securely mounted thereon a cone-shaped drum 22 and 23 which rotates with said shafts. The shafts 18 and 19 are mounted at a sufficient angle with respect to the shafts 13 and 14 to bring the adjacent or opposing surfaces of the drums 22 and 23 into parallel planes. Arranged longitudinally and centrally between the drums 22 and 23 is a driven shaft 25 the axis of which lies in the same plane as the axis of the power-shaft 10. This driven shaft 25 carries a friction wheel 26 which is splined to the shaft 25, the friction wheel 26 being of sufficient diameter to contact both drums 22 and 23, and through said contact the friction wheel 26 and the shaft 25 are driven. The power may be taken off of the shaft by any suitable means. As heretofore stated, the friction wheel 26 is splined to the shaft 25, and the latter is provided with a keyway to permit the friction wheel to be moved longitudinally along the shaft and present the friction wheel 26 to all parts of the surfaces of the drums 22 and 23.

As shown in the drawings, I have provided a lever 28 suitably secured to the supporting frame, and by means of a rod 29 the friction wheel 26 may be moved along the shaft 25. It will be noted that as the friction wheel 26 is moved toward the larger diameters of the drums 22 and 23 the rotation of the friction wheel 26 and shaft 25 is correspondingly increased, and when the friction wheel 26 is moved in the reverse direction, toward the smaller ends of the drums, the movement of rotation of said wheel and shaft will be correspondingly decreased.

It will be noted that the forward ends of the drums 22 and 23 are cone-shaped, the conical ends being cut on acute converging planes. The purpose of these inclined ends is to remove a part of the surfaces of the drums so that the friction wheel 26 will be disengaged from the drums when the wheel is moved opposite the inclined surfaces. In this position the friction wheel 26 and shaft 25 are idle. This position is known as the "neutral position" of the friction wheel 26.

I have found in practice that the friction wheel 26 may be easily shifted along the surface of the drums when the latter are rotating, but in case the latter are not rotating considerable difficulty is experienced in moving the friction wheel 26 along the drums on account of the tension that is necessary to hold the drums in driving relation against the wheel. In a case of this kind I provide means for relaxing this tension of the drums against the periphery of the friction tion wheel 26 by mounting the journal bearings 35, 35, which support the shafts 18 and 19, on movable frames which can be moved so as to increase of decrease the tension of the drums against the periphery of the friction wheel 26. This is accomplished by providing the two sliding plates 37 and 38, each of which is provided with elongated slots 39, and by means of the bolts 40 and the plates 37 and 38 may be moved transversely of the drums 22 and 23. As shown in Fig. 3 of the drawings, the plate 37 is provided with an ear 42, and the plate 38 is provided with an arm 44 each of which is engaged by the operating lever 45. This lever is pivoted at 47 between the points of connection between the plates 37 and 38 with said lever 45, so that when the lever is moved the plates 37 and 38 with the journal boxes 35, 35, carrying the shafts 18 and 19 and drums 22 and 23, will slightly move, thereby moving the drums 22 and 23 into or out of contact with the friction wheel 26, depending in which direction the lever 45 is moved. As shown in Fig. 3 of the drawings, springs 50 are arranged within the boxes carrying the shafts 18 and 19 whereby the drums 22 and 23 are firmly held into contact with the periphery of the friction wheel 26. These springs simply act as a safety device in case some foreign substance should accidentally drop between the face of the wheel 26 and the faces of the drums.

In transmitting power it is often desirable to secure movement of rotation in the opposite direction, and this is accomplished by providing the shaft 14 with a sprocket-wheel 60 which carries the sprocket-chain 61 leading to and driving the sprocket-wheel 63, the latter sprocket-wheel being loosely mounted on the shaft 25. Keyed to and moving with the sprocket-wheel 63 is a hollow drum 65 which is engaged by the clutch-member 66 keyed fast and rotating with the friction wheel 26. When the friction wheel 26 is moved along the shaft out of contact with the drums 22 and 23 and the clutch-member 66 is moved into contact with the drum 65 the friction wheel 26 and shaft 25 are then driven by the drum 65 and in a direction opposite that heretofore described.

Having thus fully described my said invention, what I wish to secure by Letters Patent, is—

1. A variable speed transmission device comprising a main power shaft, secondary shafts driven by said main shaft, a pair of revoluble cone-shaped drums carried by said secondary shafts, a driven shaft, a friction wheel arranged on said driven shaft and making a driving contact with said drums, a hollow friction clutch drum loosely mounted on the driven shaft, means for driving said friction clutch drum, a friction clutch plug secured to and rotating with the friction wheel, and means for shifting said friction wheel longitudinally on the driven shaft out of engagement of the cone-shaped drums and the friction plug into engagement with the friction clutch drum.

2. A variable speed transmission device comprising a driving shaft and a driven shaft lying in the same longitudinal plane, a pair of secondary shafts lying parallel and alongside the driven shaft, means for driving said secondary shafts from said driving shaft, a third pair of shafts lying alongside the driven shaft and at angles intersecting the axes of the secondary shafts, means for drivingly connecting the secondary shafts with the third pair of shafts, cone-shaped drums mounted on the third pair of shafts, a friction wheel mounted on the driven shaft and contacting the peripheries of the drums, and means for increasing or decreasing the angularity of the third pair of shafts with respect to the secondary shafts.

In witness whereof, I, have hereunto set my hand and seal at Indianapolis, Indiana, this, 27th day of January, A. D. one thousand nine hundred and thirteen.

CHARLES E. CLARK. [L. S.]

Witnesses:
F. W. WOERNER,
I. L. LARSON.